(12) United States Patent
Kahol et al.

(10) Patent No.: US 12,457,209 B2
(45) Date of Patent: Oct. 28, 2025

(54) STATEFUL ACCESS CONTROL OF DATA

(71) Applicant: Bitglass, LLC., Campbell, CA (US)

(72) Inventors: Anurag Kahol, Los Gatos, CA (US); Anoop Kumar Bhattacharjya, Campbell, CA (US); Balas Natarajan Kausik, Los Gatos, CA (US)

(73) Assignee: Bitglass, LLC, Austin, TX (US)

( * ) Notice: Subject to any disclaimer, the term of this patent is extended or adjusted under 35 U.S.C. 154(b) by 0 days.

(21) Appl. No.: 17/840,550

(22) Filed: Jun. 14, 2022

(65) Prior Publication Data

US 2022/0311769 A1  Sep. 29, 2022

Related U.S. Application Data

(63) Continuation of application No. 16/533,744, filed on Aug. 6, 2019, now Pat. No. 11,363,018.

(51) Int. Cl.
| | |
|---|---|
| *G06F 21/71* | (2013.01) |
| *G06F 21/60* | (2013.01) |
| *G06F 21/62* | (2013.01) |
| *H04L 9/40* | (2022.01) |
| *G06F 21/53* | (2013.01) |
| *G06F 21/78* | (2013.01) |

(52) U.S. Cl.
CPC ...... *H04L 63/0876* (2013.01); *H04L 63/0263* (2013.01); *H04L 63/0428* (2013.01); *H04L 63/0853* (2013.01); *H04L 63/18* (2013.01)

(58) Field of Classification Search
None
See application file for complete search history.

(56) References Cited

U.S. PATENT DOCUMENTS

| | | | |
|---|---|---|---|
| 8,468,244 B2 * | 6/2013 | Redlich | G06Q 50/18 |
| | | | 715/255 |
| 8,533,792 B2 | 9/2013 | Chua | |
| 8,533,860 B1 * | 9/2013 | Grecia | H04L 63/083 |
| | | | 713/185 |
| 9,262,420 B1 | 2/2016 | Schoeffler et al. | |
| 9,646,300 B1 | 5/2017 | Zhou et al. | |

(Continued)

FOREIGN PATENT DOCUMENTS

CN  107370604 A  11/2017

OTHER PUBLICATIONS

Fylaktopoulos et al., "A Distributed Modular Platform For The Development Of Cloud Based Applications", (Year: 2018).

(Continued)

*Primary Examiner* — Venkat Perungavoor
(74) *Attorney, Agent, or Firm* — Shield Intellectual Property PC; Kirk D. Wong

(57) ABSTRACT

An intermediate device enforces security rules on cloud data accesses. Network traffic between a client application and a cloud application is routed to the intermediate device. The intermediate device tags data that is stored in the cloud application in order to track the data and encrypts the data including the tags such that the intermediate device can only decrypt the encrypted data and tags in one or more trusted zones. The cloud application stores the encrypted data. When a data request is received by the intermediate device, the intermediate device uses a set of rules to decide whether the requesting user is allowed access to the data from the cloud application.

18 Claims, 5 Drawing Sheets

(56) References Cited

U.S. PATENT DOCUMENTS

| | | |
|---|---|---|
| 10,079,835 B1 | 9/2018 | Dodke et al. |
| 10,742,649 B1* | 8/2020 | Hook, Jr. ............ H04L 63/0272 |
| 11,064,016 B2 | 7/2021 | Cheng et al. |
| 11,146,566 B2 | 10/2021 | Barday et al. |
| 2002/0178271 A1 | 11/2002 | Graham et al. |
| 2012/0222106 A1 | 8/2012 | Kuehl |
| 2013/0074158 A1 | 3/2013 | Koskimies et al. |
| 2014/0258719 A1* | 9/2014 | Cidon ................. G06F 21/6209 713/165 |
| 2015/0067326 A1* | 3/2015 | Lee .................... G06F 21/6218 713/165 |
| 2015/0067893 A1* | 3/2015 | Lee ........................ G06F 21/10 726/30 |
| 2016/0277374 A1* | 9/2016 | Reid .................. H04L 63/0435 |
| 2017/0140174 A1* | 5/2017 | Lacey ................ G06Q 20/4016 |
| 2017/0286702 A1 | 10/2017 | Cheung |
| 2018/0082076 A1 | 3/2018 | Murray |
| 2018/0234401 A1* | 8/2018 | Cates ................ H04W 12/0433 |
| 2019/0349405 A1 | 11/2019 | Bengtson |
| 2020/0374268 A1 | 11/2020 | Wyatt et al. |
| 2021/0044585 A1 | 2/2021 | Kahol et al. |
| 2025/0013460 A1* | 1/2025 | Sharma .................. H04L 67/34 |

OTHER PUBLICATIONS

United States Patent and Trademark Office, U.S. Appl. No. 16/533,744, Non-Final Office Action dated Aug. 6, 2021.
United States Patent and Trademark Office, U.S. Appl. No. 16/533,744, Notice of Allowance dated Feb. 15, 2022.
Waziri et al., "Big Data Analytics And Data Security In The Cloud Via Fully Homomorphic Encryption", IJCE, (Year: 2015).
Waziri et al., "Data Loss Prevention And Challenges Faced In Their Deployments", ICTA, (Year: 2016).
Yang et al., "Design Role-Based Multi-Tenancy Access Control Scheme For Cloud Services", IEEE, (Year: 2013).

* cited by examiner

STATEFUL ACCESS CONTROL OF DATA

CROSS-REFERENCE TO RELATED APPLICATIONS

This application claims benefit as a Continuation of U.S. application Ser. No. 16/533,744, filed Aug. 6, 2019, the entire contents of the aforementioned is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to data security and, in particular, to securing data accesses between client devices and servers external to corporate infrastructures.

BACKGROUND

The transfer of sensitive corporate data outside of corporate-controlled infrastructures to external network accessible applications is a high security risk. A corporation typically seeks to permit unrestricted access to trusted devices at trusted locations, and restricted access on untrusted devices or untrusted locations. As a result of these two trends, sensitive business data resides on servers not owned by the business, is transmitted by networks not owned by the business, to client devices owned by the user rather than the business. In such a situation, conventional techniques that secure the data by securing the infrastructure are no longer practicable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
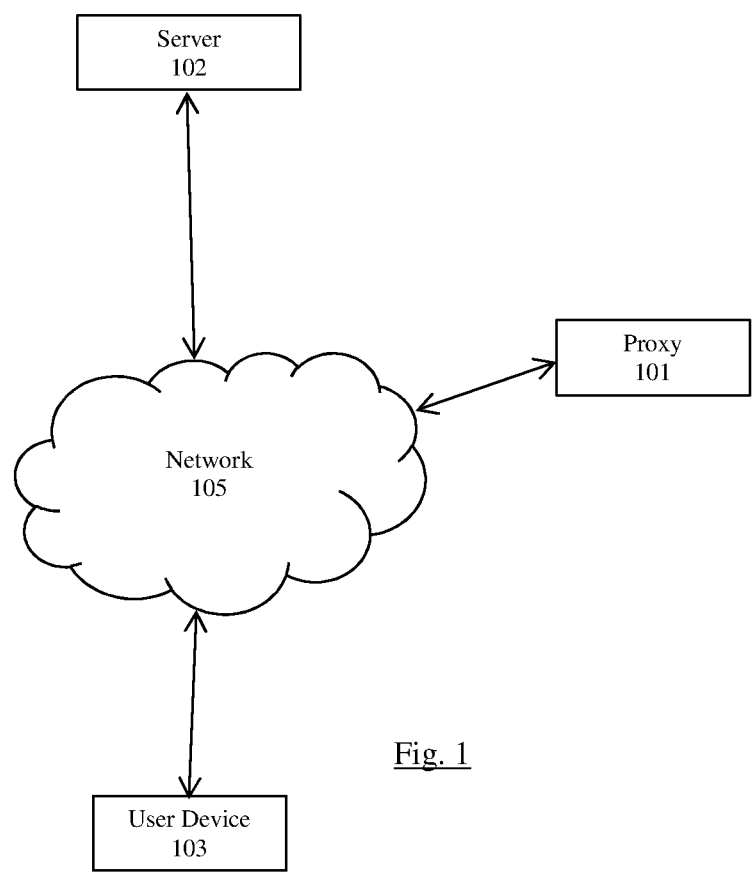
FIG. 1 illustrates a topology of a proxy system, according to an embodiment of the invention.

Example embodiments, which relate to secure applications access and data security, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
    1.0. General Overview
    2.0. Functional Overview
    2.1. Proxy Operation
       2.1.1. Data Leakage Prevention
       2.1.2. DLP Enforcement
    3.0. Implementation Mechanism—Hardware Overview
    4.0. Extensions and Alternatives

1.0. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format and should be understood as merely a conceptual prelude to a more detailed description of example embodiments that follows below.

An embodiment addresses information security risks caused by two trends in computing technology: (a) the growing prevalence of user-owned personal mobile computing devices such as smartphones and tablets, and (b) the shift in business computing applications being hosted as captive deployments on servers within a corporation, to "cloud applications" being hosted by vendors on shared servers for multiple customers. As a result of these two trends, sensitive business data resides on servers not owned by the business, is transmitted by networks not owned by the business, to client devices owned by the user rather than the business. In such a situation, conventional techniques that secure the data by securing the infrastructure are no longer practicable.

In an embodiment, a proxy server enforces security rules on data accesses. Network traffic between a client application and a cloud application is routed to the proxy. The proxy tags data that is stored in the cloud applications in order to track the data. Geographic and/or logical zones are defined where users are allowed to freely access data stored in the cloud applications. When a data request is received by the proxy, the proxy uses a set of rules to decide whether the requesting user is allowed access to the data from the cloud application.

Various modifications to the preferred embodiments and the generic principles and features described herein will be readily apparent to those skilled in the art. Thus, the disclosure is not intended to be limited to the embodiments shown but is to be accorded the widest scope consistent with the principles and features described herein.

2.0. Functional Overview

In an embodiment, a proxy system resides in the network path between client applications running on user devices and cloud applications. The system regulates access to the data, as well as securely manipulating the data so it can be securely stored on infrastructures not owned by the corporation such as client devices, shared servers, shared storage, and shared networks. The shared servers, shared storage, and shared networks may be publicly accessed or shared with other corporations.

Referring to FIG. 1, a topology of a proxy system shows an overall organization of communications between a user using a client application running on a user device (e.g., cellular smart phone, tablet device, laptop computer, desktop computer, etc.) that communicates with third party servers, data services, cloud services, cloud applications, other client devices, etc., via a proxy in order to store data and retrieve data. In an embodiment, a proxy 101 may essentially be in the "cloud." Communication between proxy 101, server 102, and user device 103 may occur across network 105. Note that server 102 and user device 103 are shown for ease of discussion as proxy 101 may be in communication with a plurality of servers and a plurality of user devices. Network 104 comprises, but is not limited to, any of: the Internet, intranet, local area networks (LANs), wide area networks (WANs), dedicated links, private computer networks, public computer networks, enterprise computer networks, etc. Proxy 101 may be communicatively connected with other proxies (not shown). Server 102 may be any of: third party servers, data services, cloud services, cloud applications, etc.

Under normal conditions, the proxy 101 receives network traffic between one or more client application programs executing on the user's device 103 and the server 102. The one or more client application programs are modified to direct all traffic to the proxy 101. All communications are then intermediated by the proxy 101. The proxy 101 can block or modify data contained in requests and responses appropriately to ensure the security of the data stored at and retrieved from the server 102. The proxy 101 enforces security rules on data accesses. In an embodiment, the proxy 101 can restrict access to users or user devices. Because data is stored on third-party servers, the data from the user devices may be encrypted by the proxy 101 to ensure that the data cannot be read by other users of the third-party servers. A data request from a user device may be blocked by the proxy 101 even though the request is accepted by the server 102 based on the security rules.

In an embodiment, with the expanding user-owned mobile device base accessing data on untrusted networks, untrusted geographic locations, etc., the security rules can include geo-fencing parameters that designate geographic areas where data access is allowed (trusted geographic areas or trusted zones) or not allowed (untrusted geographic areas or untrusted zones).

2.1. Proxy Operation 2.1.1. Data Leakage Prevention

End users may access corporate data from any device, anywhere. For example,
  (a) on trusted devices, e.g., devices controlled by the corporation, and
  (b) untrusted devices, e.g., personal devices that are not controlled by the corporation,
  (c) at trusted network locations, e.g., inside the corporation,
  (d) at untrusted network locations, e.g., cellular wireless networks.

Figure 2:
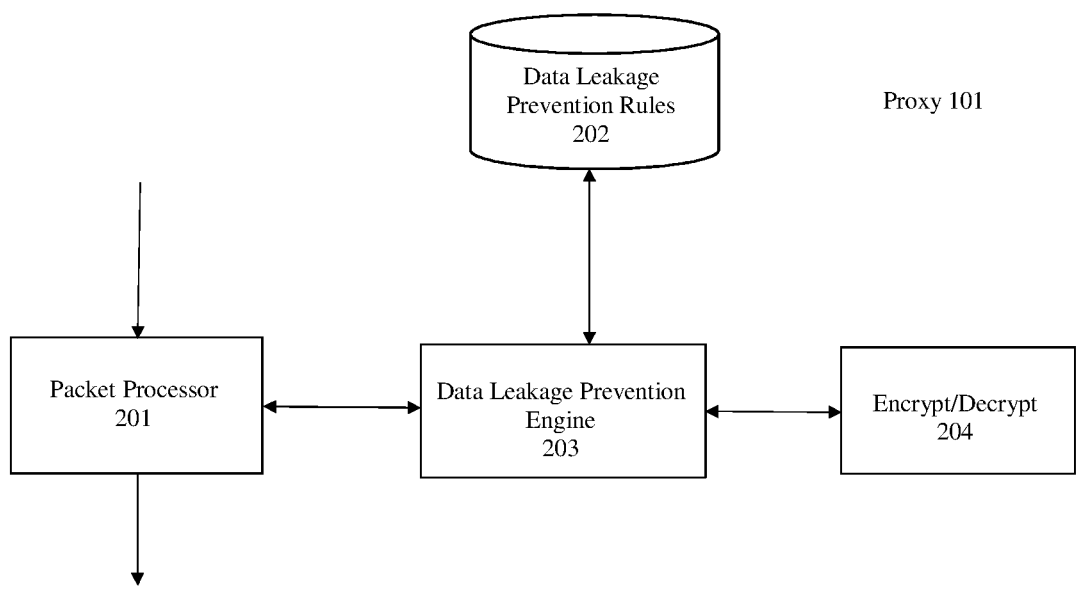
FIG. 2 illustrates a high-level block diagram of a proxy server, according to an embodiment of the invention.
Figure 3:
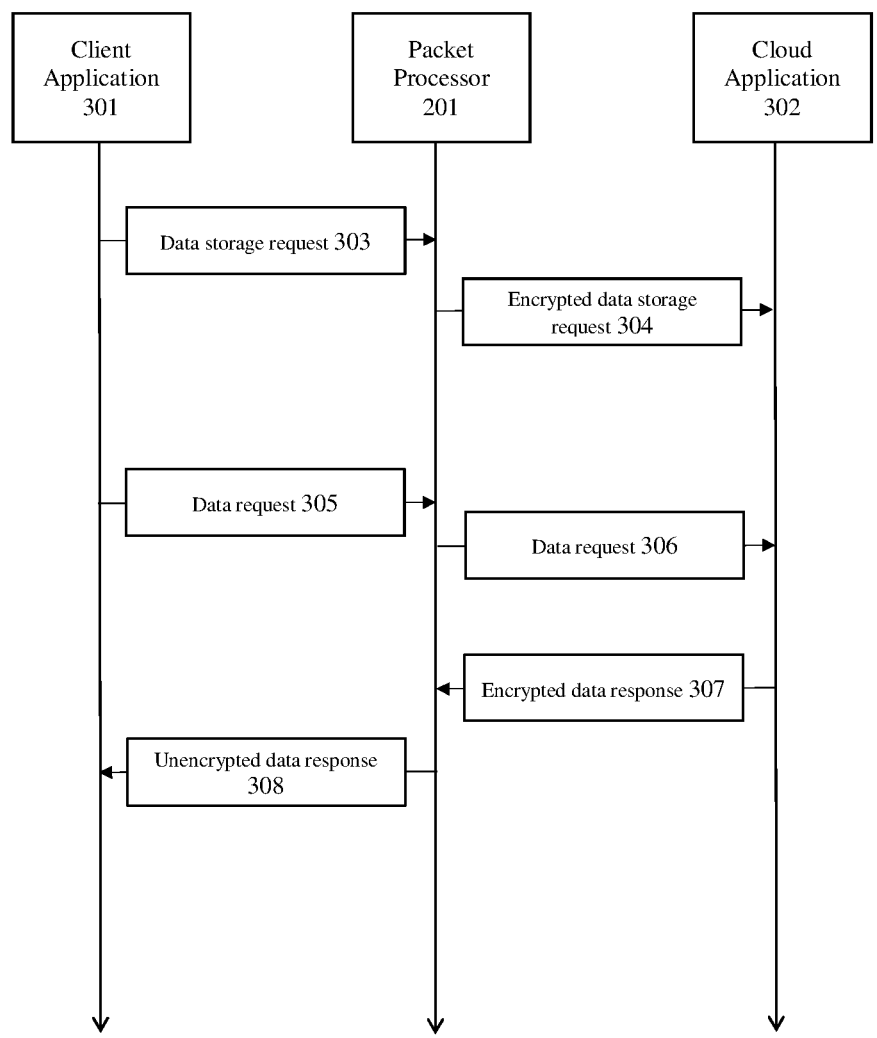
FIG. 3 illustrates a data flow timing diagram, according to an embodiment of the invention.

A corporation typically seeks to permit unrestricted access to trusted devices at trusted locations and apply restricted access to untrusted devices or untrusted locations. In an embodiment, a corporation may segment geographic and/or logical areas into zones of access and control the flow of data across them. A zone can be characterized by the source of the data, user, user device, and location. The flow of data is controlled via a network proxy called a Data Leakage Prevention (DLP) engine that enforced DLP rules. DLP engines inspect traffic for sensitive data patterns matching against predefined patterns and enforce allow/deny policies. For example, a string pattern of the form xxx-xx-xxxx can be used to recognize a social security number. Each such policy is called a DLP rule, for example:
  (Source, User, Device, Location, DLP pattern)⇒allow/deny 2.1.2. DLP Enforcement Referring to FIGS. 1-3, FIG. 2 illustrates a high-level block diagram of proxy 101 is shown. A security administrator configures a set of DLP rules 202, one for each sensitive data pattern, on the DLP engine 203 which controls the flow of data containing these patterns. As the number of sources, users, devices, locations, and the amount of sensitive data grows, the number and complexity of DLP rules and the administrative overhead of maintaining such rules grows.

An embodiment simplifies the DLP process. Proxy 101 enforces security rules on data accesses. Packet processor 201 processes packets received from client application 301 running on user device 103 and from cloud application 302 running on server 102. The packet processor 201 looks for data related requests and responses by scanning the packets for patterns identified in the DLP rules 202 using DLP engine 203.

When client application 301 sends a data storage request 303, packet processor 201 forwards the message packet to DLP engine 203. DLP engine 203 parses the message packet and compares message patterns in the DLP rules 202 to identify whether the message packet contains any data related requests or responses. The message patterns enable the system to determine what type of message is contained in the message packet. The DLP rules maybe defined for the pertinent messages that system is to process. If a message is not identified using message patterns in the DLP rules, then the packet processor 201 may forward the message packet to the destination. In this case, DLP engine 203 identifies the message to be a data storage request. DLP engine prepares the data in the request by inserting a tag into the data that indicates the data origin information. The tag may contain any combination of information needed to identify the origin of the data, e.g., data source identification, user identification, user device identification, user device location, etc. DLP engine 203 then encrypts the data 204 and forwards the message packet to the packet processor 201. The packet processor forwards the data storage request containing the encrypted data to the cloud application 302. Cloud application 302 then stores the encrypted data in storage devices associated with the cloud application. The encrypted data makes it such that no other users or processes can read the data.

The tags allow the DLP engine 203 to thereafter restrict access to users that are in the same zone of trust. As mentioned above, zones may be geographically or logically defined by an administrator and enforced by the proxy 101. Data originating inside a trusted zone can travel freely within a zone but cannot leave that zone. An example conditional statement in a DLP rule 202 may be:
  (1) IF (access is within the same zone of trust as the data)
    THEN allow
    ELSE deny Users outside the trusted zone cannot download data from a trusted zone, although in some embodiments they may preview the data on their screens. Conversely, data originating outside the trusted zone can be uploaded into the trusted zone only after inspection for malware and other risks. An example conditional statement in a DLP rule 202 may be:

(2) IF (data originates outside a trusted zone) THEN allow into trusted zone after inspection for threats
ELSE deny For example, a global corporation might have a zone of trust for the U.S., one for Asia and one for the EU. In such cases, the data elements are tagged with their zones of origin, and these tags travel with the data. Data may only be accessed from within the same trusted zone. The data may or may not be encrypted. In the current example, the combined bundle of data and the origin information is encrypted with a key that is available only within the specified trusted zone. In an alternative embodiment, the data may not be encrypted.

In an example where a client device is attempting to access stored data, packet processor 201 detects a data request 305 from client application 301 using DLP engine 203. DLP engine 203 identifies the data request and stores (e.g., in a table, list, database, etc.) information associated with the data request and marks that a response to the request is expected. Packet processor then forwards the data request 304 to the cloud application 302.

Later, as message packets are received by packet processor 201, a data response 307 from cloud application 302 containing an encrypted data payload is detected by DLP engine 203. DLP engine 203 parses the message packet and compares message patterns in the DLP rules 202 to identify that the message packet is a data response. DLP engine 203 finds that the response is associated with a data request that the DLP engine 203 had stored information for. DLP engine 203 decrypts the data in the response and searches for tag information in the data. DLP engine then uses information associated with the request to determine whether the user is in a trusted zone and, for example, uses the conditional statements included in a DLP rule associated with the particular data response as discussed above, the stored request information, and the data's tag information to make a decision whether to allow access to the data. The conditional statements are applied to the stored request information and the data's tag information in order to calculate a permissions result. If the user is allowed/has permission to access the data, then DLP forwards the response 308 repackaged with unencrypted data to the client application 301. In some embodiments, the tag information is stripped out of the data.

Figure 4:
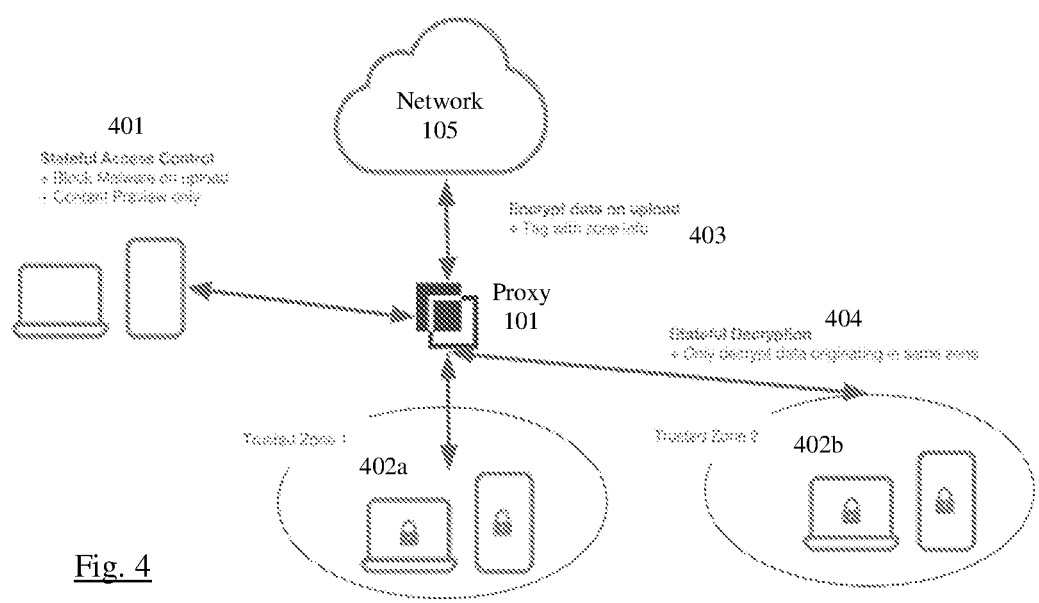
FIG. 4 illustrates a zone-oriented data security system, according to an embodiment of the invention.

Referring to FIG. 4, proxy 101 encrypts data when uploading the data to a cloud application 403. Proxy 101 ensures that data accesses outside a trusted zone 401 cannot download data from a trusted zone 402a, 402b. As previously noted, in some embodiments, such users may preview the data on their screens. Proxy 101 also ensures that data originating outside a trusted zone can be uploaded into the trusted zone only after inspection for malware and other risks.

For data accesses within a trusted zone 402a, 402b, proxy 101 decrypts the data when the data originates from the same zone 404.

In an example, a help-desk application is hosted in the cloud. A user who has difficulty opening a corrupted digital file, may upload the file from his user device to the help-desk application seeking expert assistance. The file may contain sensitive information specific to its country of origin and should only be viewable by help-desk experts in the same country or geographic region. For example, the file might be health-care information pertaining to a patient in the United States and compliance requirements might dictate that it only be viewed in the US. The user sends the URL to the file location, which is directed to the proxy 101, to the help-desk experts requesting assistance.

When a help-desk expert retrieves the file via his user device, the help-desk expert's user device sends a request to the proxy 101 that includes the URL. The proxy 101 retrieves the file from the help-desk application using a portion of the URL. The proxy 101 receives the file and extracts the tag information. Using the tag information and information from the request received from the help-desk expert's user device. The proxy 101 evaluates whether the help-desk expert and/or the help desk expert's user device are allowed access to the data in the file, as discussed above. If the help-desk expert is determined to have access to the data, the proxy 101 sends the data to the help-desk expert's user device. If the help-desk expert is determined to not have access to the data, the proxy 101 sends the help-desk expert's user device a denial to the request.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
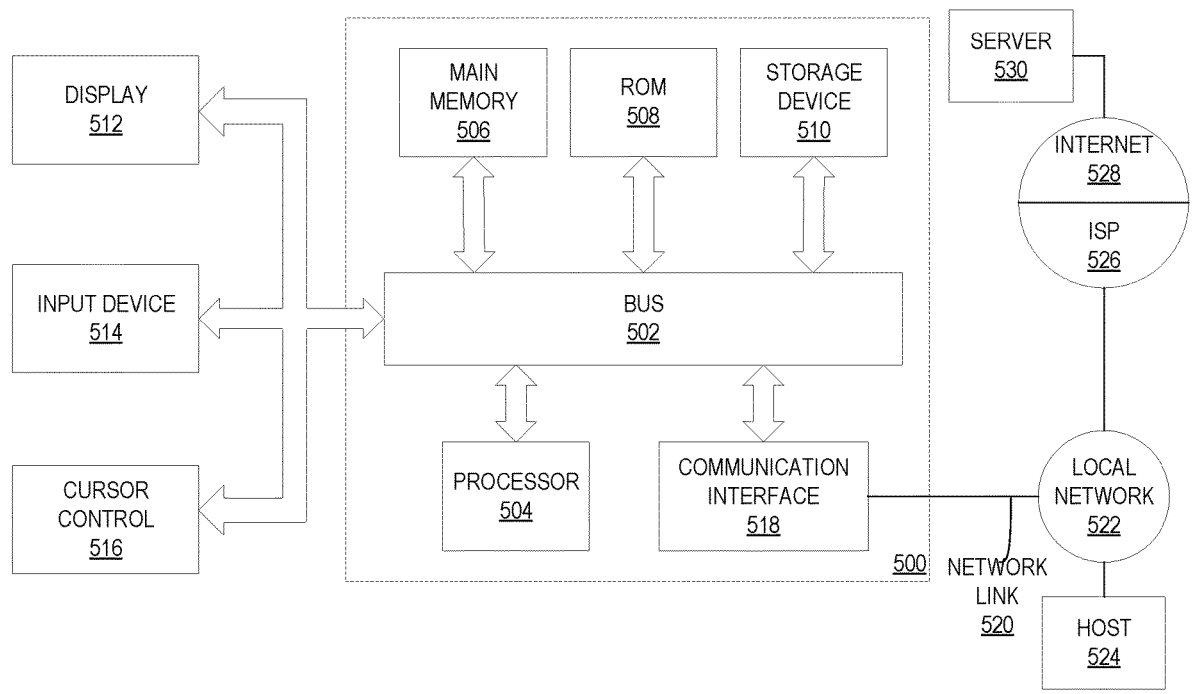
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

4.0. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
receiving, by an intermediate device, a data storage request from a first user device across a network, the data storage request requesting a cloud application to store data included in the data storage request;
inserting, by the intermediate device, tag information in the data in the data storage request, wherein the tag information includes information associated with any combination of: data source identification, user identification, user device identification, or user device location;
encrypting, by the intermediate device, the data including the tag information, the data including the tag information encrypted by the intermediate device using a key that is available only within one or more specific trusted zones;
forwarding, by the intermediate device, the data storage request with the encrypted data to the cloud application, the cloud application stores the encrypted data;
wherein the tag information is used to determine whether a second user device has permission to access the data.

2. The method as recited in claim 1, further comprising:
receiving, by the intermediate device, an application data request from a second user device across the network, the application data request requesting the encrypted data from the cloud application;
storing, by the intermediate device, information associated with the application data request;
forwarding, by the intermediate device, the application data request to the cloud application;
receiving, by the intermediate device, a response message that includes the encrypted data from the cloud application;
decrypting, by the intermediate device, the encrypted data from the response message;
extracting, by the intermediate device, the tag information from the decrypted data;
determining, by the intermediate device, whether the second user device has permission to access the decrypted data using the stored information and the tag information.

3. The method as recited in claim 1, further comprising:
receiving, by the intermediate device, an application data request from a second user device across the network, the application data request requesting the encrypted data from the cloud application;
storing, by the intermediate device, information associated with the application data request;
forwarding, by the intermediate device, the application data request to the cloud application;
receiving, by the intermediate device, a response message that includes the encrypted data from the cloud application;
decrypting, by the intermediate device, the encrypted data from the response message;
extracting, by the intermediate device, the tag information from the decrypted data;
determining, by the intermediate device, whether the second user device has permission to access the decrypted data using the stored information and the tag information;
upon determining that the second user device has permission to access the decrypted data, sending, by the intermediate device, a message to the second user device that includes the decrypted data with the tag information removed.

4. The method as recited in claim 1, further comprising:
receiving, by the intermediate device, an application data request from a second user device across the network, the application data request requesting the encrypted data from the cloud application;
storing, by the intermediate device, information associated with the application data request;
forwarding, by the intermediate device, the application data request to the cloud application;
receiving, by the intermediate device, a response message that includes the encrypted data from the cloud application;
decrypting, by the intermediate device, the encrypted data from the response message;
extracting, by the intermediate device, the tag information from the decrypted data;
determining, by the intermediate device, whether the second user device has permission to access the decrypted data using the stored information and the tag information;
upon determining that the second user device does not have permission to access the decrypted data, sending, by the intermediate device, a message to the second user device denying the application data request.

5. The method as recited in claim 1, further comprising:
receiving, by the intermediate device, an application data request from a second user device across the network, the application data request requesting the encrypted data from the cloud application;
storing, by the intermediate device, information associated with the application data request;
forwarding, by the intermediate device, the application data request to the cloud application;
receiving, by the intermediate device, a response message that includes the encrypted data from the cloud application;
decrypting, by the intermediate device, the encrypted data from the response message;
extracting, by the intermediate device, the tag information from the decrypted data;
determining, by the intermediate device, one or more access rules for the application data request by matching a pattern in the application data request with a pattern associated with one or more access rules among a plurality of access rules;
applying, by the intermediate device, the one or more access rules to the stored information and the tag information to determine whether the second user device has permission to access the decrypted data.

6. The method as recited in claim 1, further comprising:
receiving, by the intermediate device, an application data request from a second user device across the network, the application data request requesting the encrypted data from the cloud application;
storing, by the intermediate device, information associated with the application data request;
forwarding, by the intermediate device, the application data request to the cloud application;
receiving, by the intermediate device, a response message that includes the encrypted data from the cloud application;
decrypting, by the intermediate device, the encrypted data from the response message;

extracting, by the intermediate device, the tag information from the decrypted data;

determining, by the intermediate device, one or more access rules for the application data request by matching a pattern in the application data request with a pattern associated with one or more access rules among a plurality of access rules;

determining, by the intermediate device, one or more access rules for the application data request by matching a pattern in the application data request with a pattern associated with one or more access rules among a plurality of access rules, the one or more access rules define the one or more specific trusted zones where the decrypted data may be accessed;

applying, by the intermediate device, the one or more access rules to the stored information and the tag information to determine whether the second user device has permission to access the decrypted data.

7. One or more non-transitory computer-readable storage media, storing one or more sequences of instructions, which when executed by one or more processors cause performance of:

receiving, by the intermediate device, a data storage request from a first user device across a network, the data storage request requesting a cloud application to store data included in the data storage request;

inserting, by the intermediate device, tag information in the data in the data storage request, wherein the tag information includes information associated with any combination of: data source identification, user identification, user device identification, or user device location;

encrypting, by the intermediate device, the data including the tag information, the data including the tag information encrypted by the intermediate device using a key that is available only within one or more specific trusted zones;

forwarding, by the intermediate device, the data storage request with the encrypted data to the cloud application, the cloud application stores the encrypted data;

wherein the tag information is used to determine whether a second user device has permission to access the data.

8. The one or more non-transitory computer-readable storage media as recited in claim 7, wherein the one or more sequences of instructions, which when executed by one or more processors cause further performance of:

receiving, by the intermediate device, an application data request from a second user device across the network, the application data request requesting the encrypted data from the cloud application;

storing, by the intermediate device, information associated with the application data request;

forwarding, by the intermediate device, the application data request to the cloud application;

receiving, by the intermediate device, a response message that includes the encrypted data from the cloud application;

decrypting, by the intermediate device, the encrypted data from the response message;

extracting, by the intermediate device, the tag information from the decrypted data;

determining, by the intermediate device, whether the second user device has permission to access the decrypted data using the stored information and the tag information;

9. The one or more non-transitory computer-readable storage media as recited in claim 7, wherein the one or more sequences of instructions, which when executed by one or more processors cause further performance of:

receiving, by the intermediate device, an application data request from a second user device across the network, the application data request requesting the encrypted data from the cloud application;

storing, by the intermediate device, information associated with the application data request;

forwarding, by the intermediate device, the application data request to the cloud application;

receiving, by the intermediate device, a response message that includes the encrypted data from the cloud application;

decrypting, by the intermediate device, the encrypted data from the response message;

extracting, by the intermediate device, the tag information from the decrypted data;

determining, by the intermediate device, whether the second user device has permission to access the decrypted data using the stored information and the tag information;

upon determining that the second user device has permission to access the decrypted data, sending, by the intermediate device, a message to the second user device that includes the decrypted data with the tag information removed.

10. The one or more non-transitory computer-readable storage media as recited in claim 7, wherein the one or more sequences of instructions, which when executed by one or more processors cause further performance of:

receiving, by the intermediate device, an application data request from a second user device across the network, the application data request requesting the encrypted data from the cloud application;

storing, by the intermediate device, information associated with the application data request;

forwarding, by the intermediate device, the application data request to the cloud application;

receiving, by the intermediate device, a response message that includes the encrypted data from the cloud application;

decrypting, by the intermediate device, the encrypted data from the response message;

extracting, by the intermediate device, the tag information from the decrypted data;

determining, by the intermediate device, whether the second user device has permission to access the decrypted data using the stored information and the tag information;

upon determining that the second user device does not have permission to access the decrypted data, sending, by the intermediate device, a message to the second user device denying the application data request.

11. The one or more non-transitory computer-readable storage media as recited in claim 7, wherein the one or more sequences of instructions, which when executed by one or more processors cause further performance of:

receiving, by the intermediate device, an application data request from a second user device across the network, the application data request requesting the encrypted data from the cloud application;

storing, by the intermediate device, information associated with the application data request;

forwarding, by the intermediate device, the application data request to the cloud application;

receiving, by the intermediate device, a response message that includes the encrypted data from the cloud application;
decrypting, by the intermediate device, the encrypted data from the response message;
extracting, by the intermediate device, the tag information from the decrypted data;
determining, by the intermediate device, one or more access rules for the application data request by matching a pattern in the application data request with a pattern associated with one or more access rules among a plurality of access rules;
applying, by the intermediate device, the one or more access rules to the stored information and the tag information to determine whether the second user device has permission to access the decrypted data.

12. The one or more non-transitory computer-readable storage media as recited in claim 7, wherein the one or more sequences of instructions, which when executed by one or more processors cause further performance of:
receiving, by the intermediate device, an application data request from a second user device across the network, the application data request requesting the encrypted data from the cloud application;
storing, by the intermediate device, information associated with the application data request;
forwarding, by the intermediate device, the application data request to the cloud application;
receiving, by the intermediate device, a response message that includes the encrypted data from the cloud application;
decrypting, by the intermediate device, the encrypted data from the response message;
extracting, by the intermediate device, the tag information from the decrypted data;
determining, by the intermediate device, one or more access rules for the application data request by matching a pattern in the application data request with a pattern associated with one or more access rules among a plurality of access rules;
determining, by the intermediate device, one or more access rules for the application data request by matching a pattern in the application data request with a pattern associated with one or more access rules among a plurality of access rules, the one or more access rules define the one or more trusted zones where the decrypted data may be accessed;
applying, by the intermediate device, the one or more access rules to the stored information and the tag information to determine whether the second user device has permission to access the decrypted data.

13. An apparatus, comprising:
one or more processors; and
a memory storing instructions, which when executed by the one or more processors, cause the one or more processors to perform:
receiving a data storage request from a first user device across a network, the data storage request requesting a cloud application to store data included in the data storage request;
inserting tag information in the data in the data storage request, wherein the tag information includes information associated with any combination of: data source identification, user identification, user device identification, or user device location;
encrypting the data including the tag information, the data including the tag information encrypted by the apparatus using a key that is available only within one or more specific trusted zones;
forwarding the data storage request with the encrypted data to the cloud application, the cloud application stores the encrypted data;
wherein the tag information is used to determine whether a second user device has permission to access the data.

14. The apparatus as recited in claim 13, wherein the instructions, which when executed by the one or more processors, cause the one or more processors to further perform:
receiving an application data request from a second user device across the network, the application data request requesting the encrypted data from the cloud application;
storing information associated with the application data request;
forwarding the application data request to the cloud application;
receiving a response message that includes the encrypted data from the cloud application;
decrypting the encrypted data from the response message;
extracting the tag information from the decrypted data;
determining whether the second user device has permission to access the decrypted data using the stored information and the tag information.

15. The apparatus as recited in claim 13, wherein the instructions, which when executed by the one or more processors, cause the one or more processors to further perform:
receiving an application data request from a second user device across the network, the application data request requesting the encrypted data from the cloud application;
storing information associated with the application data request;
forwarding the application data request to the cloud application;
receiving a response message that includes the encrypted data from the cloud application;
decrypting the encrypted data from the response message;
extracting the tag information from the decrypted data;
determining whether the second user device has permission to access the decrypted data using the stored information and the tag information;
upon determining that the second user device has permission to access the decrypted data, sending a message to the second user device that includes the decrypted data with the tag information removed.

16. The apparatus as recited in claim 13, wherein the instructions, which when executed by the one or more processors, cause the one or more processors to further perform:
receiving an application data request from a second user device across the network, the application data request requesting the encrypted data from the cloud application;
storing information associated with the application data request;
forwarding the application data request to the cloud application;
receiving a response message that includes the encrypted data from the cloud application;
decrypting the encrypted data from the response message;
extracting the tag information from the decrypted data;

determining whether the second user device has permission to access the decrypted data using the stored information and the tag information;

upon determining that the second user device does not have permission to access the decrypted data, sending a message to the second user device denying the application data request.

17. The apparatus as recited in claim 13, wherein the instructions, which when executed by the one or more processors, cause the one or more processors to further perform:

receiving an application data request from a second user device across the network, the application data request requesting the encrypted data from the cloud application;

storing information associated with the application data request;

forwarding the application data request to the cloud application;

receiving a response message that includes the encrypted data from the cloud application;

decrypting the encrypted data from the response message;

extracting the tag information from the decrypted data;

determining one or more access rules for the application data request by matching a pattern in the application data request with a pattern associated with one or more access rules among a plurality of access rules;

applying the one or more access rules to the stored information and the tag information to determine whether the second user device has permission to access the decrypted data.

18. The apparatus as recited in claim 13, wherein the instructions, which when executed by the one or more processors, cause the one or more processors to further perform:

receiving an application data request from a second user device across the network, the application data request requesting the encrypted data from the cloud application;

storing information associated with the application data request;

forwarding the application data request to the cloud application;

receiving a response message that includes the encrypted data from the cloud application;

decrypting the encrypted data from the response message;

extracting the tag information from the decrypted data;

determining one or more access rules for the application data request by matching a pattern in the application data request with a pattern associated with one or more access rules among a plurality of access rules;

determining one or more access rules for the application data request by matching a pattern in the application data request with a pattern associated with one or more access rules among a plurality of access rules, the one or more access rules define the one or more specific trusted zones where the decrypted data may be accessed;

applying the one or more access rules to the stored information and the tag information to determine whether the second user device has permission to access the decrypted data.

\* \* \* \* \*